United States Patent
Jackson et al.

(10) Patent No.: US 7,643,915 B2
(45) Date of Patent: Jan. 5, 2010

(54) DIAGNOSING MALFUNCTIONING WHEEL ALIGNMENT SYSTEM

(75) Inventors: David A. Jackson, Point Roberts, WA (US); Michael J. Robb, San Jose, CA (US); Patrick B. O'Mahony, San Jose, CA (US)

(73) Assignee: Snap-On Incorporated, Kenosha, WI (US)

( * ) Notice: Subject to any disclaimer, the term of this patent is extended or adjusted under 35 U.S.C. 154(b) by 1185 days.

(21) Appl. No.: 10/628,044

(22) Filed: Jul. 26, 2003

(65) Prior Publication Data

US 2005/0021198 A1    Jan. 27, 2005

Related U.S. Application Data

(60) Provisional application No. 60/398,633, filed on Jul. 25, 2002.

(51) Int. Cl.
*G01M 17/00* (2006.01)
(52) U.S. Cl. .................... 701/29; 701/28; 701/31; 701/35; 340/439
(58) Field of Classification Search .......... 701/28, 701/29, 30, 31, 35; 340/438, 439
See application file for complete search history.

(56) References Cited

U.S. PATENT DOCUMENTS

| | | | |
|---|---|---|---|
| 5,092,340 A * | 3/1992 | Yamaguchi et al. | ......... 600/508 |
| 5,535,522 A | 7/1996 | Jackson | |
| 5,809,658 A * | 9/1998 | Jackson et al. | ................. 33/288 |
| 6,323,776 B1 | 11/2001 | Jackson et al. | |
| 6,370,455 B1 | 4/2002 | Larson et al. | |
| 6,405,111 B2 * | 6/2002 | Rogers et al. | ................. 701/33 |
| 2002/0029101 A1 | 3/2002 | Larson et al. | |
| 2004/0024502 A1 * | 2/2004 | Squires et al. | ................. 701/33 |

FOREIGN PATENT DOCUMENTS

WO    WO 99/23783    5/1999

* cited by examiner

*Primary Examiner*—Gertrude Arthur Jeanglaud
(74) *Attorney, Agent, or Firm*—McDermott Will & Emery LLP

(57) ABSTRACT

A diagnostic system allows a service technician to diagnose a malfunction that occurs during operation of a wheel alignment system after the malfunction has occurred and is no longer apparent. The system, which includes one or more cameras for gathering images of the alignment, gathers information in real time about the alignment of a plurality of wheels. The images include reflections from a target mounted on each wheel, and a processing system in communication with the cameras receives the images and generates analysis data based on them, the analysis data providing an analysis of the alignment of the wheels. A memory device stores the images and the analysis data, and a storage control causes the memory device to store the images and the analysis data in response to activation of the storage control by the operator during the occurrence of the malfunction. A display device in communication with the memory device selectively displays the images and the analysis data, and a play-back control causes the display device to selectively display the images and the analysis data to the service technician in response to activation of the play-back control after the occurrence of the malfunction.

26 Claims, 2 Drawing Sheets

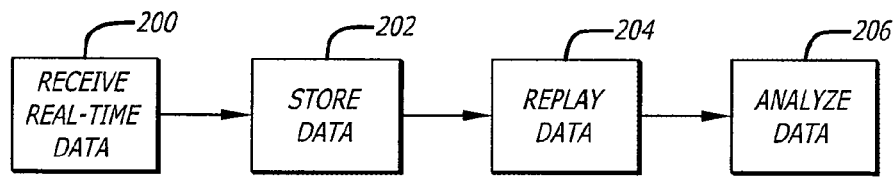
FIG. 2
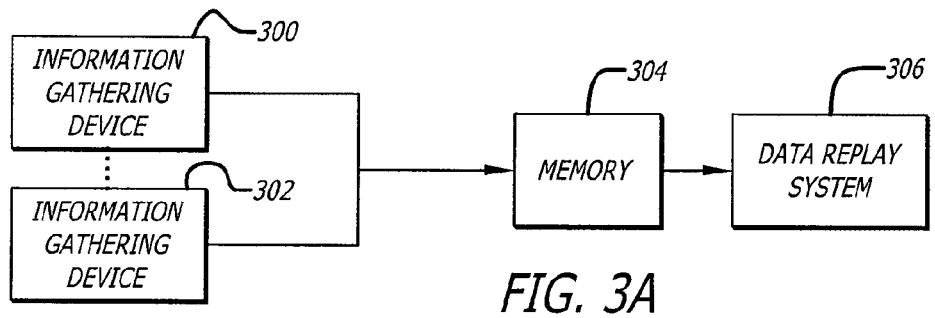
FIG. 3A
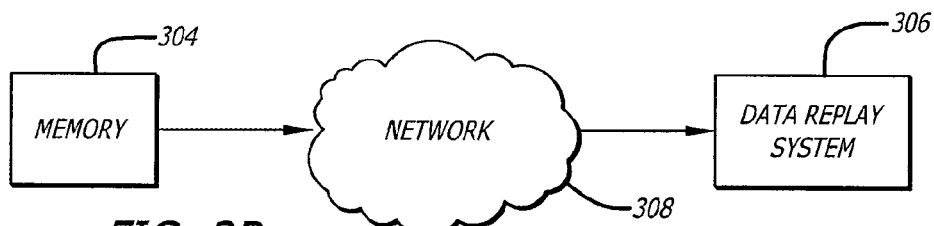
FIG. 3B
FIG. 5
| | INTENSITY | GAIN | RMS |
|---|---|---|---|
| $T_0$ | 140 | 10 | .05 |
| $T_1$ | 0 | 10 | 0 |
| $T_2$ | 0 | 10 | 0 |
| • | • | • | • |
| • | • | • | • |
| • | • | • | • |
| $T_N$ | 140 | 10 | .05 |

DIAGNOSING MALFUNCTIONING WHEEL ALIGNMENT SYSTEM

CROSS REFERENCE TO RELATED APPLICATION

This application is related to and claims the benefit of the filing date of U.S. provisional application Ser. No. 60/398,633, filed on Jul. 25, 2002, entitled "Wheel Alignment Diagnostic System and Method," the contents of which are incorporated herein by reference.

BACKGROUND

1. Field of Disclosure

This application relates to equipment diagnostics and, in one embodiment, technology that facilitates diagnoses of malfunctioning automotive alignment systems.

2. General Background and State of the Art

Automotive diagnostic and repair equipment sometimes fails to function during use or, because of improper use, fails to successfully accomplish its desired function. In particular, equipment used for automotive wheel alignment may be susceptible to malfunctions during use that may be difficult to detect or correct at a later time. This is due to the sensitivity of such equipment to environmental disturbances, as well as to the large number of cooperative components involved in wheel alignment systems.

One example of this problem is during wheel alignment. Wheel alignment is a process of adjusting the angles of wheels on a vehicle so that they are generally perpendicular to the ground and parallel to one another. The purpose of these adjustments is to attain maximum tire life, as well as to keep the vehicle tracks straight when driving along a straight and level road. In order to adjust the wheel angles to achieve proper wheel alignment, the actual wheel angles must first be measured. Then, the requisite adjustments may then be calculated. Two particular angles that are often utilized in wheel alignment methods are commonly referred to as "camber" and "toe." Camber, which is typically measured in degrees, is the angle of the wheel's deviation from a vertical plane. Therefore, camber is angle of the wheel that is seen when viewed from the front of the vehicle. If the top of the wheel is leaning away from the center of the car, the camber is positive; if it is leaning in toward to center of the car, then the camber is negative.

Toe is the difference in distance between the front of two tires and the back of those tires. It is normally measured in fractions of an inch, and is usually set close to zero, meaning that the wheels are substantially parallel to one another. "Toe-in" means that the fronts of the tires are closer to each other than the rears; "toe-out" is the opposite situation. These, as well as other wheel alignment parameters, are quantified through sensitive measurement techniques that can encounter significant errors in the event of an equipment malfunction or environmental disturbance. Some types of systems for measuring such wheel alignment parameters may be more sensitive than others, though almost all are susceptible to such malfunctions and disturbances.

Wheel alignment may involve placing instrumentation on each of a vehicle's four wheels. The instrumentation may include a set of optical targets clamped to each wheel. An optical sensor means such as a camera is situated to view the targets, and a light may be directed toward the targets with sufficient intensity to cause the targets' reflections to be detected by the optical sensor means. The optical sensor means may view a target located on each wheel and forms an image of each target. Electrical signals corresponding to each of the images may be transferred to a processor, which correlates the perspective image of each of the targets with the true shape of each target. The processor may then relate the known geometric dimensions of the target with the dimensions of corresponding elements in the perspective images, and can thereby calculate the alignment of the wheels. Such methods are well known in the art, and described in detail in U.S. Pat. Nos. 5,535,522 and 5,809,658, for example, each of which is incorporated herein by reference.

Unfortunately, such procedures and systems can encounter a variety of operational problems due to the sensitivity of the various system components and the sheer number of components that must cooperate during operation of the system. Unfortunately, in the case of malfunctions during use of such equipment, the operator often lacks the skills necessary for diagnosing the malfunction or correcting it. Technicians who service the equipment, on the other hand, might have the ability to diagnose and correct such problems, but are often unable to successfully trouble-shoot operational problems because they are unable to be present during the malfunction. By the time a service technician arrives on the premises, the problem may no longer be observable. This sometimes leads to the problem not being solved and, in some instances, to the costly replacement of components erroneously thought to have been malfunctioning.

Therefore, what is needed is an operational malfunction diagnostic method that allows for a skilled technician to diagnose an operational problem even after the problem has occurred and is no longer apparent.

SUMMARY

The systems and methods of this application help to overcome these as well as other problems in the prior art by recording data indicative of the circumstances at the time of an apparent problem in a memory device, and then displaying those data to an equipment service technician when he later arrives to service the equipment. As used herein, the term "malfunction event" shall refer to an equipment malfunction or apparent malfunction due to environmental disturbances, which will be discussed in further detail below.

In one aspect of the application, a diagnostic system for troubleshooting a malfunction during operation of an instrument that gathers and analyzes real-time data may include one or more information-gathering devices for gathering the real-time data, a memory device in communication therewith for storing the real-time data, and a data replay system in communication with the memory device for playing back the real-time data after the real time data was gathered.

In another aspect of the application, a diagnostic system for allowing a service technician to diagnose a malfunction during operation of a wheel alignment system that gathers information in real time about the alignment of a plurality of wheels may include one or more cameras for gathering images of the alignment in real time. The images may include reflections from a target mounted on each wheel, and a processing system in communication with the cameras may receive the images and generate analysis data based on them, the analysis data providing an analysis of the alignment of the wheels. A memory device may store the images and the analysis data, and a storage control may cause the memory device to store the images and the analysis data in response to activation of the storage control by the operator during the occurrence of the malfunction. Alternatively, activation of the storage control may occur automatically as part of a rolling data collection history or following an automatic detection of a pre-defined trigger. A display device in communication with the memory device may selectively display the images and the analysis data, and a play-back control may cause the display device to selectively display the images, analysis data and other captured data whether processed or unprocessed, to the service technician in response to activation of the play-back control after the occurrence of the malfunction. Data that are played back may include, but are not limited to, captured alignment data, processed data, intermediate alignment results, final alignment values, processed images, and the like. The data may be played back sequentially in order to mimic its original real-time capture, or may be played back selectively according to a user's input. Also, data collection may occur on a rolling basis, such that data is continually collected and buffered in memory, then erased as new data is collected, becoming permanently stored only when the system enters a diagnostic mode, whether by user control or automatic detection. The rolling data collection ensures that any data collected for a malfunction event is preceded by a certain amount of buffered data that was collected immediately prior to the malfunction event.

In yet another aspect of the application, a method of diagnosing a malfunction during the operation of an instrument that gathers and analyzes real-time wheel alignment data may include receiving real-time wheel alignment data from at least one information-gathering device, storing the data in a memory device, re-playing the stored data, and analyzing the re-played data to diagnose a malfunction. Real-time wheel alignment data may also be calculated from stored analysis data, then re-played and analyzed to diagnose a malfunction.

In a further aspect of the application, a means for diagnosing a malfunction during the operation of an instrument that gathers and analyzes real-time wheel alignment data may include receiving means for receiving real-time wheel alignment data from at least one information-gathering means, storage means for storing the data, playback means for re-playing the stored data, and processor means for analyzing the re-played data to diagnose a malfunction.

The foregoing and other objects, features, and advantages of the disclosures herein will become apparent from a reading of the following detailed description of exemplary embodiments thereof, in conjunction with the accompanying drawings.

It is understood that other embodiments of the disclosures herein will become readily apparent to those skilled in the art from the following detailed description, wherein it is shown and described only exemplary embodiments of those disclosures by way of illustration. As will be realized, the disclosures herein are capable of being implemented and practiced in other and different embodiments and its several details are capable of modification in various other respects, all without departing from the spirit and scope of their teachings. Accordingly, the drawings and detailed description are to be regarded as illustrative in nature and not as restrictive.

BRIEF DESCRIPTION OF THE DRAWINGS

FIG. 2 illustrates a method for diagnosing a malfunction that occurs during the operation of an information gathering device after the malfunction occurs;

FIG. 3A is a block diagram illustrating components of an equipment operational malfunction diagnostic system;

FIG. 3B is a block diagram illustrating an alternative embodiment of one portion of the operational malfunction diagnostic system of FIG. 3A;

FIG. 5 is a table of exemplary data gathered and utilized in an equipment operational malfunction diagnostic system.

DETAILED DESCRIPTION OF ILLUSTRATIVE EMBODIMENTS

The detailed description set forth below in connection with the appended drawings is intended as a description of exemplary embodiments and is not intended to represent the only embodiments in which the concepts explained in these embodiments can be practiced. The term "exemplary" means "serving as an example, instance, or illustration," and should not necessarily be construed as preferred or advantageous over other embodiments. The detailed description includes details for the purpose of providing an understanding of the concepts herein. However, it will be apparent to those skilled in the art that these teachings may be implemented and practiced without these specific details.

Figure 1:
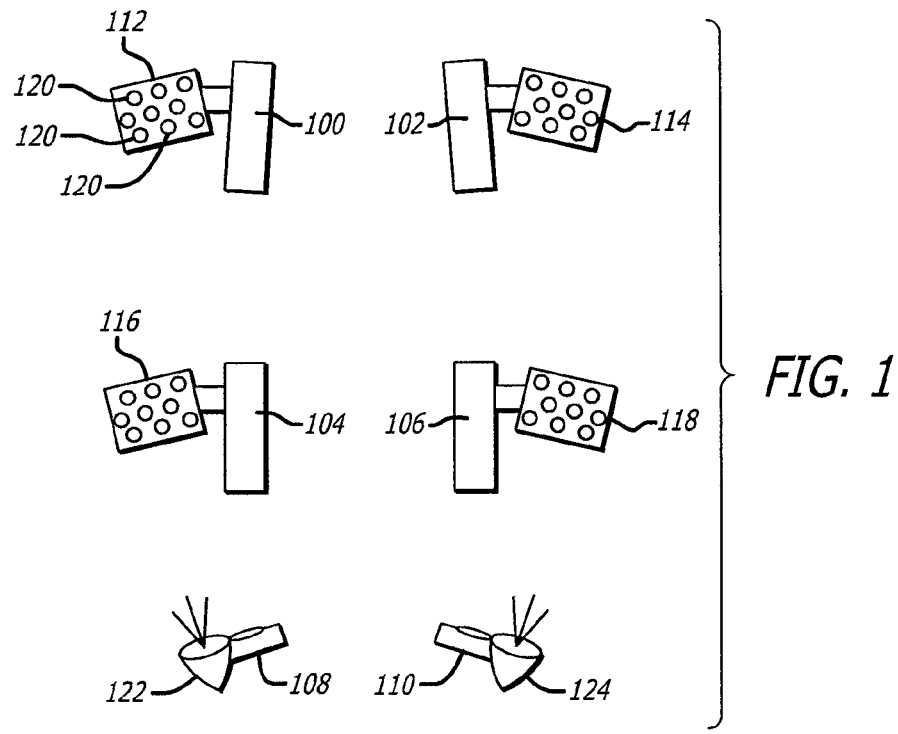
FIG. 1 illustrates an exemplary wheel alignment system.

FIG. 1 illustrates an exemplary wheel alignment system that may be utilized with the diagnostic systems and methods disclosed herein. Information gathering devices may be used to obtain wheel alignment data for each of the wheels 100, 102, 104, and 106 of a vehicle. The information gathering devices may include an optical sensor such as one or more video or other cameras 108 and 110. Cameras 108 and 110 may be focused on individual sets of optical targets, 112, 114, 116, and 118 that are each mounted to one of the wheels 100, 102, 104, and 106. Each set of targets, such as set 112, may include a plurality of optical targets 120. A light or pair of lights 122 and 124, such as a strobe or other type of light, may project light onto targets 120 to cause them to reflect light sufficient to be detected by cameras 108 and 110.

Cameras 108, 110 view each target 120 located on each of the wheels 100, 102, 104, 106 and forms an image of each target. Electrical signals corresponding to each of the images are transferred to a processor, which correlates the perspective image of each of the targets with the true shape of each target. The processor relates the known geometric dimensions of the target with the dimensions of corresponding elements in the perspective images. This process is repeated for each of a plurality of different vehicle positions such that wheel alignment parameters can be calculated from the collected data. Such systems methods are well known in the art, and are described for example in the patents referenced above, U.S. Pat. Nos. 5,535,522 and 5,809,658. Unfortunately, a variety of malfunction events are possible with these types of optical alignment systems. Hardware failures may occur, some being permanent and others being intermittent. Also, environmental disturbances can interfere with a camera's or optical target's normal operation, causing the appearance of hardware failure.

Environmental disturbances that the systems and methods disclosed herein can diagnose include, but are not necessarily limited to, an object or person that blocks the line of sight between a camera and an optical target that is mounted on a wheel, dirt or debris that is on one of the optical targets, causing it to be undetectable to the camera, or sunlight and other reflections in the area of the alignment operation. For example, a vehicle's own chrome details can cause reflections that interfere with a camera's detection of the mounted optical targets. Other environmental issues include the vehicle not being within the camera's focal length, vibrations that occur during the alignment process, or large temperature gradients that cause what is known in the art as a "mirage effect."

Hardware faults that the systems and methods disclosed herein can diagnose include, but are not necessarily limited to, intermittent camera failures, or optical target alignment problems. For example, problems with the cameras or the targets may cause one or more targets to become invisible to a camera during a certain portion of the alignment process, such as when the vehicle is in a rolled-back position, yet be visible during other portions of the process, such as when the vehicle is in its normal, starting position. Both environmental and hardware issues may be difficult to detect after the actual occurrence, particularly if they are intermittent in nature. Therefore, the systems and methods disclosed herein may involve capturing alignment data during the alignment process, storing the data during a malfunction event, then allowing an experienced technician to "recreate" the malfunction event by reviewing and analyzing the collected and stored data.

FIG. 2 illustrates a method for diagnosing a malfunction that occurs during the operation of an information gathering device after the malfunction occurs. Alignment data are received by instrumentation in a wheel alignment system, such as cameras operating in conjunction with optical targets, for example. The data collection occurs during a malfunction event, and is triggered by an alignment technician upon noticing a malfunction in the alignment process. When a malfunction is detected, the alignment system may be placed in a diagnostic mode, which causes the real-time data to be collected at regular, pre-determined intervals, indicated at block 200. For example, the data may be collected once every two seconds for the first 10 seconds, once every four seconds during the following 8 seconds, and once every five seconds thereafter. Of course, the disclosures herein are applicable to any data collection frequency, and the frequency need not diminish over time. The frequency may be variable according to a variety of different patterns or triggers, such as pre-defined programmable triggers based upon out-of-tolerance conditions, deteriorating or improving conditions, and the like. Also, the alignment system may always collect real-time data, keeping a certain amount of it in memory while discarding older data, so that some amount of real-time data is constantly scrolled through the system's memory. That way, when a malfunction event does occur and the system switches to diagnostic mode, it will have some amount of historical data to supplement the real-time data it gathers in the diagnostic mode. It is also possible to pre-define various triggers for initiating the diagnostic mode data collection and storage, such as triggers based upon data levels indicative of certain conditions, and to begin capturing the data after a trigger is detected. The triggers can include an out of tolerance condition or a deteriorating condition.

At block 202, the data received during the diagnostic mode are stored, such as in temporary or permanent computer storage. At a later time, the data are recalled from memory, and is re-played as indicated at block 204. It is at this time that an experienced alignment system technician can re-play the previously collected data to "recreate" the malfunction event and analyze the re-played data to diagnose the malfunction. A description of the format and content of the re-played data is discussed in further detail below with reference to FIG. 5. During the data re-play, the diagnostic technician can analyze the data, as indicated at block 206, to troubleshoot for system malfunctions or environmental interferences, which can then be selectively corrected and remedied.

FIG. 3A is a block diagram illustrating components of an equipment operational malfunction diagnostic system. Information gathering devices 300, 302, such as cameras focused on optical targets for example, collect alignment data for the wheels on which the optical targets are mounted. As described above, the collection may be triggered during the occurrence of an alignment system malfunction. An alignment system operator, upon detecting a malfunction, or an apparent malfunction due to environmental issues, enables the diagnostic system. This may be done by placing the alignment system into a diagnostic mode, or a separate diagnostic system may be utilized to collect alignment data during a malfunction event. In either case, the system is triggered to collect alignment data at each of a series of time intervals, as described above.

The information collected during the malfunction event is stored in memory 304, which may be permanent or temporary computer memory. Then, a data replay system 306 presents the recalled data to a diagnostic technician, who is able to review the malfunction event and diagnose it by analyzing the real-time data that had been collected during the event. In this manner, the diagnostic technician is able to "recreate" the malfunction event. For example, in a scenario in which a plurality of "snapshot" images was taken of targets mounted on wheels during a malfunction, that series of images can be re-played to a diagnostic technician well after the event has occurred. Thus, while the malfunction or apparent malfunction may have been intermittent, and may no longer be apparent, it can still be examined and diagnosed by an experienced technician who was not present when the event occurred. The data replay system may include a computer and a display screen for retrieving the stored data, analyzing them such as by processing images, and displaying the data to the diagnostic technician.

FIG. 3B is a block diagram illustrating an alternative embodiment of one portion of the operational malfunction diagnostic system of FIG. 3A, in which alignment data stored in memory 304 is transmitted to a diagnostic technician for review on data replay system 306 over a communications network 308. Communications network may comprise the Internet, a local area network, a wireless network, or any other form of data transfer platform. In this embodiment, the diagnostic technician can remotely troubleshoot a malfunctioning alignment system by receiving malfunction episode alignment data across network 308 at any location that has a data replay system 306 available for use.

Figure 4:
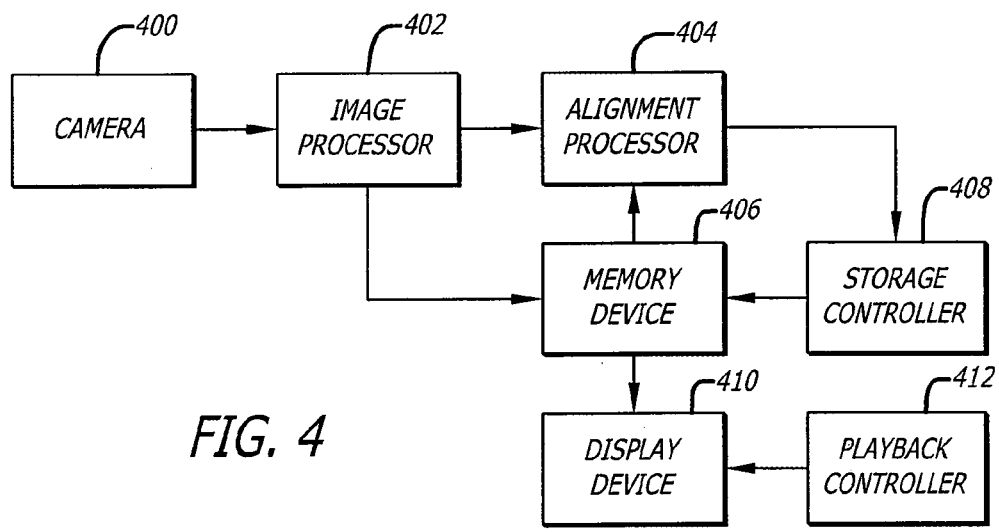
FIG. 4 is a block diagram illustrating additional components of an exemplary equipment operational malfunction diagnostic system.

FIG. 4 is a block diagram illustrating additional components of an exemplary equipment operational malfunction diagnostic system. A camera 400 collects data from optical targets mounted on wheels that are undergoing a malfunctioning alignment process. An image processor 402 receives the data and processes the resultant images. These images are utilized to calculate the wheels' alignment angles by alignment processor 404, and stored in a memory device 406. A storage controller 408, which may be hardware or software driven, causes the images to be stored at each of a sequence of pre-determined time intervals. The frequency of these time intervals may be variable according to a variety of different patterns or triggers. For example, data may collected at a rate that is based upon the severity of the malfunction event, such as by programming pre-defined triggers based upon out-of-tolerance conditions, deteriorating or improving conditions, and the like.

During a diagnostic phase, during which a diagnostic technician can review and analyze the collected data, the images are presented on a display device 410. This may comprise a display monitor for presenting images and other forms of the collected data, as illustrated in FIG. 5. A playback controller 412, which may be hardware or software driven, is operated by the diagnostic technician to manipulate the playback sequence on display device 410. The diagnostic technician can thereby choose to "recreate" the malfunction event exactly, or to focus on certain moments during the malfunction event. Data that are played back to investigate the malfunction event may include, but are not limited to, captured alignment data, processed data, intermediate alignment results, final alignment values, processed images, and the like.

FIG. 5 illustrates exemplary data gathered and utilized in an exemplary malfunction diagnostic system. The display device and display system referenced in previous figures may present data in numeric or other formats in addition to the images previously described. For example, certain types of data collected during a malfunction event may be expressed in table format, as illustrated by exemplary table 500. The exemplary table 500 includes a first column denoting time intervals $T_0$ 502 through $T_N$ 504, at which diagnostic alignment data were collected and stored by an alignment system operating in its diagnostic mode. For each of these time intervals, the table reports values such as intensity 506, camera gain or amplification 508, and an error value based on a root mean squared operation (RMS) 510. Intensity relates to the level of reflection produced by an optical target, and to the ability of a camera to detect it. Gain relates to the amplification of the camera, and therefore also relates to the ability of a camera to detect a reflective optical target. RMS relates to a well-known error analysis algorithm that can be applied to data that are collected by an alignment system. It is seen that the intensity of one optical target at the first and last time intervals is 140, while the intensity of that same optical target at the second two time interval is 0. Thus, a malfunction can be identified as having occurred between those two time intervals. Similarly, the RMS values reveal a malfunction. Based on these and other values, the specific cause of the malfunction can be analyzed and targeted by an experienced and skilled diagnostic technician. Of course, it is to be understood that other values may be measured, expressed and analyzed according to the disclosures herein, which are not limited to the specific illustrative examples discussed. For example, wheel alignment systems and malfunction diagnostic systems may record and report distances to test whether an optical target is within a camera's focal length, relative angular positions of an optical target in three dimensional space, the number of targets that are visible to a camera, the number of targets used in an alignment calculation, a variety of camera parameters, and the like.

The various figures and diagrams described in connection with the embodiments disclosed herein may be implemented or performed with hardware components, software components or any combination thereof designed to perform the functions described herein. The previous description of the disclosed embodiments is provided to enable any person skilled in the art to make or use the teachings of the present disclosure. Various modifications to these embodiments will be readily apparent to those skilled in the art, and the generic principles defined herein may be applied to other embodiments without departing from the spirit or scope of the application. Thus, the disclosures herein are not intended to be limited to the embodiments shown and discussed, but are to be accorded the widest scope consistent with the principles and novel features disclosed herein.

We claim:

1. A diagnostic system for diagnosing a malfunction during the operation of an instrument that gathers and analyzes real-time data associated with a vehicle, the system comprising:
   one or more information-gathering devices for gathering the real-time data associated with the instrument;
   a memory device in communication with the information-gathering devices for storing the real-time data associated with the instrument; and
   a data replay system in communication with the memory device for playing back the real-time data associated with the instrument after the real time data associated with the vehicle or the instrument was gathered.

2. The diagnostic system of claim 1, wherein the one or more information-gathering devices includes a camera focused on an optical target in a wheel alignment system.

3. The diagnostic system of claim 2 wherein the real-time data comprises a plurality of images gathered from the camera.

4. The diagnostic system of claim 1, further comprising:
   a data controller in communication with the information-gathering devices and the memory device that causes the memory device to store data from the information-gathering devices at pre-determined time intervals.

5. The diagnostic system of claim 3, wherein the pre-determined time intervals vary in frequency over time.

6. A diagnostic system for allowing a service technician to diagnose a malfunction during operation by an operator of a wheel alignment system that gathers information in real time about the alignment of a plurality of wheels comprising:
   one or more cameras for gathering images of the alignment in real time, the images including a target mounted on a wheel;
   a processing system in communication with the cameras for receiving the images and for generating analysis data based on the images, the analysis data providing an analysis of the alignment of the wheels;
   a memory device for storing the images or the analysis data;
   a storage control for causing the memory device to store the images and the analysis data in response to activation of the storage control by the operator during the occurrence of the malfunction;
   a display device in communication with the memory device for selectively displaying the images and the analysis data; and
   a play-back control for causing the display device to selectively display the images and the analysis data to the service technician in response to activation of the play-back control after the occurrence of the malfunction.

7. The diagnostic system of claim 6 wherein the storage control causes the storage of the images or the analysis data to be accomplished at predetermined intervals.

8. The diagnostic system of claim 7 wherein the pre-determined intervals vary in frequency over time.

9. A method of diagnosing a malfunction during the operation of an instrument that gathers and analyzes real-time wheel alignment data comprising:
   receiving real-time wheel alignment data from at least one information-gathering device;
   storing the real-time wheel alignment data in a memory device;
   re-playing the stored, real-time wheel alignment data; and
   analyzing the re-played data to diagnose a malfunction.

10. The method of claim 9 wherein the at least one information gathering device includes a video camera.

11. The method of claim 9 wherein the real-time wheel alignment data comprises images of a target mounted on a wheel.

12. The method of claim 9, further comprising:
   processing the real-time wheel alignment data to generate wheel alignment analysis data; storing the wheel alignment analysis data;

re-playing the wheel alignment analysis data in conjunction with the re-playing of the real-time wheel alignment data; and analyzing the re-played wheel alignment analysis data to diagnose a malfunction.

13. The method of claim 9 further comprising transmitting the stored, real-time wheel alignment data across a communications network prior to re-playing it.

14. The method of claim 9 wherein the storing of real-time wheel alignment data in a memory device is done at pre-determined intervals that vary in frequency over time.

15. A means for diagnosing a malfunction during the operation of an instrument that gathers and analyzes real-time wheel alignment data comprising:

receiving means for receiving real-time wheel alignment data from at least one information-gathering means;

storage means for storing the real-time wheel alignment data; playback means for re-playing the stored, real-time wheel alignment data; and processor means for analyzing the re-played data to diagnose a malfunction.

16. The diagnostic means of claim 15 wherein the at least one means for gathering information gathering includes an imaging means.

17. The diagnostic means of claim 16 wherein the real-time wheel alignment data comprises images including an image of an optical target mounted on a wheel.

18. The diagnostic means of claim 15 wherein the processor means is a first processor means, the diagnostic means further comprising:

a second processor means for processing the real-time wheel alignment data to generate wheel alignment analysis data;

storage means for storing the wheel alignment analysis data; the playback means further configured for re-playing the wheel alignment analysis data in conjunction with the re-playing of the real-time wheel alignment data; and the first processor means further configured for analyzing the re-played wheel alignment analysis data to diagnose a malfunction.

19. The diagnostic means of claim 15 further comprising a transmitting means for transmitting the stored, real-time wheel alignment data across a communications network prior to re-playing it.

20. The diagnostic means of claim 15 wherein the storage means includes a controller means for causing the storing of wheel alignment data to be performed at pre-determined intervals that vary in frequency over time.

21. A diagnostic system for allowing a service technician to diagnose a malfunction during operation by an operator of a wheel alignment system that gathers information in real time about the alignment of a plurality of wheels comprising:

one or more sensors for generating images of a target mounted on each of the plurality of wheels;

a processing system in communication with the sensors for receiving the images and for generating analysis data based on the images, the analysis data providing an analysis of the alignment of the wheels;

a memory device for storing the images or the analysis data;

a storage control for causing the memory device to store the images or the analysis data;

a display device in communication with the memory device for selectively displaying the images or the analysis data; and a play-back control for causing the display device to selectively display the images or the analysis data in response to activation of the play-back control.

22. A vehicle service system for allowing a service technician to diagnose a malfunction comprising:

one or more sensors for generating images associated with a vehicle;

a processing system in communication with the sensors for receiving the images or for generating analysis data based on the images, the analysis data providing an analysis of geometric parameters associated with the vehicle;

a memory device for storing the images or the analysis data;

a storage control for causing the memory device to store the images or the analysis data;

a display device in communication with the memory device for selectively displaying the images or the analysis data; and a play-back control for causing the display device to selectively display the images or the analysis data in response to activation of the play-back control.

23. A vehicle service system allowing a service technician to diagnose a malfunction comprising:

one or more sensing means for generating images associated with a vehicle;

a processing system in communication with the sensing means for receiving the images and for generating analysis data based on the images, the analysis data providing an analysis of geometric parameters associated with the vehicle;

data storage means for storing the images or the analysis data;

storage control means for causing the data storage means to store the images or the analysis data;

display means in communication with the data storage means for selectively displaying the images or the analysis data; and play-back control means for causing the display means to selectively display the images or the analysis data in response to activation of the play-back control.

24. A system for diagnosing a malfunction during the operation of a vehicle test instrument comprising:

means for receiving real-time data associated with the operations of the vehicle test instrument;

a memory device for storing the real-time data;

means for re-playing the stored, real-time data; and a data processor for analyzing the re-played data to diagnose a malfunction of the vehicle test instrument.

25. A vehicle service system allowing a service technician to diagnose a malfunction comprising:

at least one sensing devices for sensing real-time signals associated with a vehicle or the operations of the vehicle service system;

a processing system configured to be in communication with the at least one sensing device for receiving the sensed signals and for generating analysis data based on the sensed signals, the analysis data providing an analysis of the vehicle or the operations of the vehicle service system;

a data storage device for storing the sensed signals or the analysis data;

a storage control device for causing the data storage device to store the sensed signals;

a display device; and a play-back control device configured to be in communication with the data storage device or the display device, for causing the display device to selectively display the sensed signals stored in the data storage device.

26. A diagnostic system for diagnosing a malfunction during the operation of an instrument that gathers and analyzes real-time data associated with a vehicle, the system comprising:

one or more information-gathering devices for gathering the real-time data associated with the vehicle or the instrument;

a memory device in communication with the information-gathering devices for storing the real-time data associated with the vehicle or the instrument; and a data replay system in communication with the memory device for playing back the real-time data associated with the vehicle or the instrument after the real time data associated with the vehicle or the instrument was gathered;

wherein the one or more information-gathering devices includes an imaging device for gathering images associated with the vehicle or the instrument.

* * * * *